April 9, 1968
P. D. CAESAR
3,377,265
ELECTROCHEMICAL ELECTRODE
Filed Nov. 16, 1964
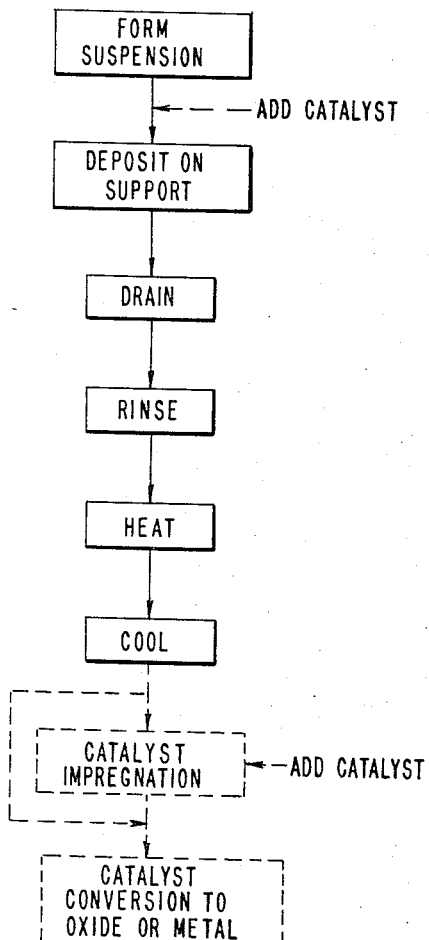
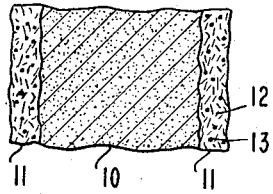
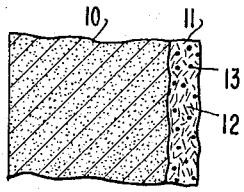
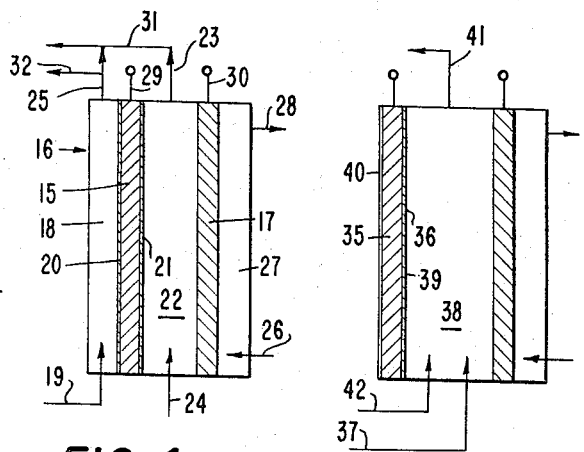
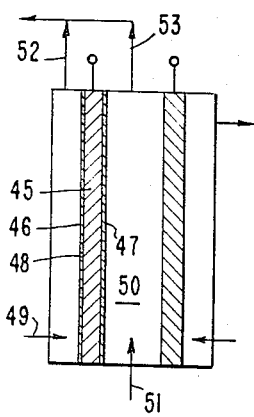
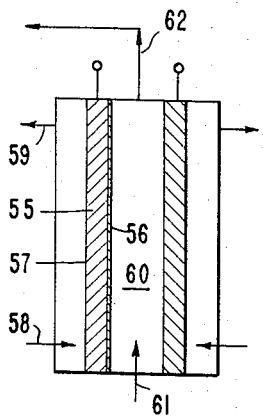
INVENTOR.
PHILIP D. CAESAR
BY
ATTORNEY United States Patent Office 3,377,265
Patented Apr. 9, 1968

3,377,265
ELECTROCHEMICAL ELECTRODE
Philip D. Caesar, Princeton, N.J., assignor to Mobil Oil Corporation, a corporation of New York
Continuation-in-part of application Ser. No. 146,411, Oct. 20, 1961. This application Nov. 16, 1964, Ser. No. 411,204
8 Claims. (Cl. 204—290)

This invention relates to an improved porous electrode for use in electrochemical cells and comprises a multi-component structure made up of an electron-conductive support, a very thin layer of fibrous alumina monohydrate on the support, and an electrochemical catalyst disposed in and on said layer. The electrode is for use in electrochemical cells generally, including fuel cells, cells for electroorganic synthesis, electrolytic cells, energy storage cells, etc.

This application is a continuation-in-part of co-pending application Ser. No. 146,411, filed Oct. 20, 1961, and now abandoned.

The electrode is advantageous for its high surface area, over which reacting species may be widely distributed and catalyzed. The layer of fibrous alumina monohydrate is adapted to hold any suitable catalyst material, as well as other components, affording substantial flexibility in this respect and making available a choice of electrodes for various cells. The layer is of variable thickness, ranging down to an extremely fine thinness of near molecular size, to the end of reducing hindrance to the movement of ionic and other species and favoring the accessibility of catalyst and electron conductor to the species. Also, by virtue of such layer, and a suitable choice of catalyst, the electrode is resistant to acidic and basic electrolytes. Other advantages will be apparent from the ensuing description.

Referring to the drawings,

FIG. 1 is a flow diagram illustrating methods of preparing the electrode;

FIG. 2 is a diagrammatic representation of the electrode of the invention, the view being a cross section and showing the electrode only in part;

FIG. 3 is like FIG. 2, but showing a modification;

FIGS. 4, 5, 6, and 7 are diagrammatic views of several electrodes for use in fuel cells, each showing the disposition of the electrode in the fuel cell.

Referring to FIG. 1, the preparation of the electrode may be described briefly. As there indicated, an aqueous colloidal suspension of fibrous alumina monohydrate, also referred to as fibrous alumina or fibrous boehmite, is first formed as by dispersing the solid fibrous material in water, using good mixing, to form a suspension of the desired concentration. It is then deposited on the surface of the support, for example, a support of porous carbon having the shape and dimensions desired for the final electrode. The suspension may be applied in any suitable way, as by dropping, pouring, spraying, or brushing the same over the support, or by dipping or immersing the support in the suspension. The result is to obtain a layer of the suspension on the surface of the support, and it may be drained simply by allowing it to stand for a time. Then the layer may be gently rinsed, if desired, which step does not remove the deposited layer or film owing to its adherence to the support and owing to the fact that the film is resistant to water. Thereafter the film is heated to temperatures up to about 250° C. for a few minutes to promote drying and to set and strengthen the same and impart resistance to acids and bases. The coated or filmed support is then cooled.

A catalyst material is incorporated in the electrode either before or after the deposition of the film of fibrous boehmite on the support, and preferably before such deposition. This addition is indicated by dashed lines in FIG. 1 to denote the alternative character of the addition step, although it will be understood that one or other of these alternative steps is to be used. Considering the preferred step, the catalyst in finely divided form, either as a solid, suspension, solution, etc., and in the metal, metal oxide or heat-decomposable metal salt form, may be added to the fibrous boehmite suspension, with good stirring, and the mixture deposited on the support. The succeeding steps are as described, except that in the heating step the temperature may range from about 50 to as high as about 400° C. in order to set the film. Temperatures above about 400° C. are not suitable as the boehmite form tends to be unstable. Following cooling of the electrode, the film in those cases where the catalyst is a heat-decomposable metal salt, is heated to a suitable temperature not exceeding about 400° C. to convert the salt to its metal or metal oxide form. It will be understood in this connection that metal salts will be used which decompose to the metal or metal oxide at temperatures not above about 400° C. Where the catalyst used is already in the metal or metal oxide form, the electrode preparation is completed by the cooling step.

Where the catalyst is added after deposition of the film, it is preferably incorporated in the film following the heating and cooling steps, and this may be done by impregnating the film with a solution or suspension of the catalyst in the form of a heat-decomposable metal salt, or a suspension of the catalyst in finely divided metal or metal oxide form. Thereafter, the impregnated film is heated to convert the metal salt, when used, to the metal or metal oxide form; and if the metal salt is not used, preparation of the electrode is completed by a drying step.

Heat-decomposable salts are conventional. In some cases, metal hydroxides may be used as the heat-decomposable compound. Usually, the decomposition product of the salt or hydroxide is the metal oxide, or an intermediate that is easily converted to the oxide. The oxide, in turn, may be reduced with hydrogen to the metal. In addition, catalyst metal oxides and metals are also conventional, although when chemically formed in and on the alumina layer, they usually have the advantage of a smaller particle size.

The fibrous alumina monohydrate is a synthetic material made by heating an aqueous acidic suspension of alumina until there is formed fibrous alumina monohydrate having the crystal lattice of naturally occurring boehmite. The material is commercially available and is made by procedures described in U.S. Patent 2,915,475. It comprises fibrils having an average length of 100 to 700 millimicrons, but also ranging as high as 1500 to 2000 millimicrons. The fibrils may be in a relatively non-aggregated form and/or in a more or less aggregated form, and they are characterized by lying flat. Surface area of the material ranges from 200 to 400 sq. m./g.

The preferred electron-conductive support is porous conductive carbon or graphite or graphitized carbon pressed to substantially the shape and size desired for the electrode. The carbon or graphite used to make the support may have an internal surface area of at least 1, and more preferably 50 or 100 to 500, sq. m./g., a porosity of 10 to 35%, a pore size of 0.1 micron, or less, to 100 microns, and preferably 0.5 to 50 microns, a real density of 1.9 to 2.24, and an apparent density of 1.0 to 1.9. In place of compacted carbon or graphite as the electron-conducting material, it is possible to use a gauze, grid, sieve, screen or mesh made of metals such as titanium, nickel, platinum, palladium, cobalt, iron, tungsten, molybdenum, osmium, silver, stainless steel, Nichrome (Ni-Cr and Fe-Ni-Cr alloys), and the like. These perforate metal supports may have openings ranging from 1 to 1000 or 2000 microns in diameter. In some cases, the foregoing metallic electron-conducting materials, or most of them, may also be initially in particle form and the support fabricated therefrom by compacting the particles; for example, titanium powder may be compacted to shape to produce a porous structure the pores of which have diameters in the range of 1 to 50 microns. Or the support may be compacted from a mixture of two or more powders such as platinum and nickel; or the platinum and nickel may be disposed on a porous stainless steel sheet to form the support. Other supports include conductive plastics, metallized plastics, and metallized ceramics.

The catalyst, as indicated above, is any conventional electrochemical catalyst material, by which is meant a material which catalyzes an electrochemical reaction, such as the oxidation of hydrogen or the reduction of oxygen, as in a fuel cell; or the anodic oxidation or cathodic reduction of an organic compound, such as glucose or anthracene, as in organic electrosynthesis, or electro-organic synthesis, as it is sometimes termed; or the chemical synthesis of an inorganic compound, such as hydrogen peroxide, as in an electrolytic cell.

In FIG. 2, an illustrative electrode is shown. It comprises the support 10, which may be of porous carbon or graphite, having on its outer surface a thin layer 11 of fibrous alumina monohydrate in the form of fibers and/or fibrils 12. Disposed in and on the fibrous alumina are particles 13 of catalyst material. It will be understood that the film 11 may be on both sides of the electrode, as in FIG. 2, or on one side, as in FIG. 3, or it may completely surround or enclose the support regardless of its shape, or in the case of a cylindrical support it may be disposed on the bore surfaces as well as on the external surfaces.

The thickness of the alumina film may range from that of a single layer of collidal alumina particles, say about 25 to 50 A.U. thick, to that of a thicker layer of up to about 1000 A.U. or even to 10,000 A.U. film thickness may be controlled by controlling the concentration of alumina in the suspension. For example, by using a suspension containing about 0.1 to 0.5% by weight of the fibrous alumina, the resulting layer will be about 25 to 50 A.U. in thickness, while a suspension having about 1 to 5% of the alumina will give a layer up to 1000 A.U. thick. The interfiber and/or interfibril spaces in the film are large, and in consequence the porosity of the film is high.

The electron-conductivity of the electrode is essentially that of the porous carbon support. While the presence of alumina increases the electrical resistivity of the electrode, the alumina film is so thin that it does not substantially impede the flow of electrons to the carbon support. Where thicker films of alumina are employed, the conductivity of the alumina may be increased by adding to it, preferably while in the form of the suspension prior to application of the same to the support, an amount of a conductivity-improving agent, such as colloidal graphite, or a finely subdivided metal like gold, silver, titanium, 49Cr-51Fe alloy, or 0.7Pd-27Zr-72.3Ti alloy, or a solution of nickel nitrate and lithium hydroxide which after heating form a NiO/LiO mixture which improves the conductivity of the electrode.

The alumina film, after the heat treatment described above, is hard and very adherent to the surfaces of the support. Its presence makes the electrode substantially resistant to aqueous solutions of acids and bases, such as are used as electrolytes in electrochemical cells. The fibrous alumina monohydrate is, in fact, more resistant than other forms of alumina, and is also resistant to oxidation.

The resulting electrode may be of conventional shape, i.e., in strip, sheet, disc, cylindrical or other form. Its thickness is variable, ranging from 1/32 inch or less to 1/4 inch or more.

For preparing an electrode for use in organic electrosynthesis, the catalyst material may be any of those conventionally employed, including platinum, lead oxide, nickel, iron, copper, lead, mercury, cadmium, zinc, tin, etc. Any convenient source material of the catalyst may be used, including finely divided catalyst per se, or a solution or dispersion of a salt that is easily decomposed by heat to give the catalyst metal or metal oxide. The salt may be added per se to the above-described fibrous boehmite suspension, or may first be dissolved or dispersed in water and then added to the suspension. By controlling the concentration of the salt in the suspension, the concentration of catalyst material in the film may be controlled. Where the catalyst is added to the formed film, it is preferably applied in solution or dispersion form, and in this case also the concentration of catalyst in the film may be controlled by control of its concentration in the solution or dispersion. The amount of catalyst in the film may vary from about 0.05 to 500 mg., preferably 0.1 to 50 mg., per sq. cm. of film area. In this connection, an amount of about 0.1 g. of catalyst used in fabricating the electrode is approximately equivalent to about 0.009 g. per sq. cm. of electrode area. The catalyst should of course be inert in the electrolyte, and this is a factor which should control the choice of catalyst. For example, the noble metals and brown lead oxide are resistant in acid electrolytes; gold and palladium are resistant to bases as well as acids; Group VIII metals, silver, mercury, and rhenium are resistant in alkaline electrolytes; platinum is suitable when the electrolyte contains a salt of an organic acid, alloys like 49-A51Fe and 0.7Pd-27Zr-72.3Ti are resistant to acids, etc.

The electrosynthesis reactions that may be carried out are conventional; thus, aliphatic and aromatic nitro compounds may undergo cathodic reduction to amines using electrode catalysts of nickel, lead, copper and mercury, and sometimes making use of promoters comprising various metal salts; aromatic nitro compounds may be cathodically reduced to azoxy and azo compounds using electrode catalysts of nickel, lead, and mercury in the first case and of nickel or Phosphor bronze in the second case; ketones may be reduced to hydrocarbons at a zinc-containing electrode; ketones and aldehydes are reducible to alcohols with electrode catalysts like lead and copper; oximes may be reduced to amines using lead and tin catalysts in the electrode; aliphatic acid salts can be anodically oxidized at platinum-containing anodes; etc.

The electrode for use in fuel cells may have a broad choice of catalyst material including metals from Groups Ib, IIb, IVb, Vb, VIb, VIIb, and VIII of the Periodic Table, and further including lanthanum, and cerium. Also suitable are beryllium and magnesium of Group IIa, gallium, indium, and thallium of Group IIIa, and germanium, tin, and lead of Group IVa. Based on atomic number, the useful metals are those of atomic numbers 4, 12, 22–32, 40–50, 57, 58, and 72–82. Oxides of these materials, and alloys containing any of them, such as Ag-Ni-Pd and Pd-Ag, are suitable. Preferred catalysts are metals and oxides of metals from Group VIII; also the group known as the noble metals; and the group of transition elements. The electrodes are suitable for use in the oxidation of hydrogen, hydrocarbons, oxygenated hydrocarbons, and other conventional fuels, gaseous or liquid, and including hydrazine, ammonia, carbon monoxide, etc. Depending on its use in a fuel cell, the electrode may have pores that extend through the electrode, or that are disposed on one side only or on both sides but without extending therethrough. These various types are illustrated in FIGS. 4–7 which may be described briefly.

In FIG. 4, the fuel electrode, which is illustrated by a flat anode 15, is disposed in a fuel cell 16 which also has a conventional cathode 17. A mixture of fuel gas dispersed or dissolved in the electrolyte enters the chamber 18 by line 19 and flows along the left hand side of the anode 15, the latter having the catalyst-impregnated alumina film on both sides, as indicated at 20 and 21. At least a portion of the fuel-electrolyte mixture flows through the flow-through pores (not shown) in the anode, and at the three-phase boundary of such pores the electrochemical oxidation of the fuel takes place. The mixture, comprising electrolyte and any unused fuel, leaves the electrode, entering the electrolyte chamber 22, and may pass from such chamber through lines 23 and 31, and thence to one or more zones not shown where the fuel may be replenished and/or the electrolyte replaced in whole or in part and the mixture returned to the fuel cell by line 19, as set forth in copending application Ser. No. 282,669, filed May 23, 1963. A flow of electrolyte is maintained in the chamber 22, entering by line 24 and leaving by lines 23 and 31. Excess fuel, together with electrolyte, may also leave the compartment 18 by lines 25 and 31.

Gaseous oxidant is introduced to the cathode 17 by flowing air or oxygen through line 26 through compartment 27, and the excess is removed through line 28. Electric current produced by the cell may be removed by lead 29, passed to an external circuit not shown, and returned by lead 30.

The cathode or oxygen electrode may be conventional, as indicated, or, as described below, may be an electrode made in accordance with the invention. This applies to FIGS. 4–7, and also to all cells for which the present electrodes are useful.

In FIG. 5, the electrode is illustrated by the flat anode 35 which is in the form of a flat plate having the porous alumina film on one side only, indicated at 36. Fuel and electrolyte in admixture flow in line 37 through the compartment 38 as indicated, making contact with the pores in the adjacent side 39 of anode 35, these pores providing a large effective area. Desirably, the fuel-electrolyte mixture is presented to the pores through the use of one or more nozzles (not shown), and the mixture penetrates the pores by diffusion and/or convection. On the opposite side the anode is unfilmed, making contact with the wall 40 of the fuel cell. The remaining construction and flows of the cell are substantially as described in FIG. 4, the fuel-electrolyte mixture leaving the cell by line 41 to be replenished or replaced, returning by line 37, and additional fuel being added by line 42.

In FIG. 6, the flat anode 45 has catalyst-containing alumina films 46 and 47 on both sides, and pores are present in both surfaces but they do not extend through the electrode. The flow of fuel-electrolyte mixture is along both sides of the anode, entering anode chamber 48 by line 49 and entering electrolyte chamber 50 by line 51. The flows leave these chambers by lines 52 and 53, respectively, for further treatment as described.

In FIG. 7, the anode 55 has a catalyst-impregnated alumina film 56 on one side, and there are pores on both sides, each pore extending through the anode; however, the mouths of the pores on the fuel side 57 of the anode are larger than the mouths on the electrolyte side 56, providing what is conventionally known as a dual porosity anode. The advantage of the latter is known, namely, the pressure of the fuel gas balances the pressure of the electrolyte so that the gas does not blow through the pores and so that the electrolyte does not flood them. In FIG. 7, fuel from line 58 makes contact with the side 57 of the anode and exits from that side through line 59. Electrolyte is disposed in the compartment 60, entering by line 61 and leaving by line 62 to be treated as described.

In the foregoing cases a flat anode is illustrated for the sake of a simplified showing, but the anode may have other shapes, as will be understood. It will also be understood that the flows in FIGS. 4–7 are illustrative and that changes are possible. For example, in FIG. 4, fuel alone may enter chamber 18 by line 19, exiting in part by lines 25 and 32 and being recycled to line 19, and in part passing through the electrode 15; while electrolyte alone may enter chamber 22 by line 24, leaving by lines 23 and 31 (together with any unused fuel) for replacement or other suitable treatment and recirculation to line 24. It will be further understood that suitable valves will be located as necessary in all of the showings.

While the catalyst-impregnated alumina-containing electrodes are employed as anodes in the foregoing illustrative fuel cells, it will be understood that they may also be used as the oxygen electrode or cathode, and when so used, they will be provided with suitable catalysts, including nickel, palladium, palladium black, gold, platinum, silver, rhodium, iridium, cobalt oxide, nickel oxide, nickel oxide-lithium oxide, nickel-nickel oxide, nickel-silver, etc.

The electrodes are of use in electrolytic cells where current is passed through the cell to cause chemical reactions at the electrodes, particularly inorganic chemical reactions. Any conventionally used electrode material may be incorporated in the alumina film, including nickel, platinum, lead dioxide, iron, mercury, lead, steel, and carbon, and including alloys containing one or more of the foregoing metals. In the case of carbon, it is possible to place in the alumina film a carbon or graphite of any desired porosity different from that of the carbon support. The resulting electrodes provide the advantages already described and are suitable in place of conventional electrodes. For example, an electrode comprising steel as the support and coated with a nickel-containing film of fibrous boehmite may be suitable for the electrolysis of water to produce hydrogen and also oxygen. With platinum or lead dioxide as the catalyst in the alumina film, sodium perchlorate may be formed by anodically oxidizing sodium chlorate.

Besides catalysts, other agents may be incorporated in the alumina film, including hydrophilic agents, hydrophobic agents, and conductivity-improving agents. Hydrophilic agents may improve the contact of the electrode, fuel, and electrolyte, and may comprise conventional wetting agents, particularly negatively charged materials which tend to be firmly held by the boehmite fibrils, which are positively charged. Hydrophobic agents may reduce the hazard of the flooding of the electrode pores with aqueous electrolyte. After a period of use of the electrode, the surfaces of the larger pores tend to become more hydrophilic, resulting in the entry of liquid electrolyte and producing an undesirable effect on the gas liquid distribution with a tendency to flooding. This effect may be counteracted by incorporating in the alumina film a waterproofing agent such as a silicone oil, a polymer like polytetrafluoroethylene in emulsion form, polyethylene, polypropylene, and other polyolefins. Conductivity-improving agents are useful, especially with thicker films of alumina, and include particles of graphite, various metals, NiO/LiO, and other conducting materials.

Dual porosity electrodes are obtainable by disposing on a carbon support having large pores an alumina film having smaller pores, such that the fuel gas makes contact with the electrode on the side of the large pores, and the aqueous electrolyte makes contact on the side of the small pores. With electrodes of this type it is possible to balance the fuel gas pressure against the electrolyte pressure within the pores and thus prevent them from being flooded by the electrolyte or from having the gas blow the electrolye completely out of the pores. Electrodes of this type may also be formed as by depositing an alumina film on each side of, say, a flat support; the film on one side should be thicker than that on the other side so that the pores in each side will have openings of different sizes.

While porous supports are preferred, it is also possible to use smooth supports, especially in the case of non-flow-through electrodes. In this case, the catalyst-containing alumina film is of sufficient thickness, within the above described ranges, so that the three-phase contact boundary will be disposed entirely in the film. All of the catalytic action takes place in the film adjacent the smooth support, and the latter serves as the electron conductor.

It is also within the purview of the invention to employ supports which are non-conductive but which can be made conductive by the deposition of a conducting material on the surfaces of the same. The non-conductive support would then serve merely to provide strength to the electrode.

The periodic table classifications as used herein are based on the arrangement distributed by E. H. Sargent & Co. and further identified by the legend "Copyright 1962 Dyna-Slide Co."

It will be understood that the invention is capable of obvious variations without departing form its scope.

In the light of the foregoing description, the following is claimed.

1. An electrode for an electrochemical cell comprising an electron-conductive support, a thin porous film of fibrous alumina bonded to said support, said alumina having the crystal lattice of boehmite, said film having a thickness of up to about 10,000 Angstrom units, and, deposited in and on said film, an electrochemical catalyst.

2. The electrode of claim 1 wherein said catalyst is a metal-containing catalyst.

3. The electrode of claim 2 wherein said metal is selected from the class consisting of Groups I$b$, II$b$, IV$b$, V$b$, VI$b$, VII$b$, VIII, lanthanum, cerium, beryllium, magnesium, gallium, indium, thallium, germanium, tin, and lead of the Periodic Table.

4. The electrode of claim 2 wherein said metal is selected from the class consisting of metals having an atomic number of 3, 12, 22–32, 40–50, 57, 58, and 72–82.

5. The electrode of claim 1 wherein said catalyst is a fuel cell electrode catalyst.

6. The electrode of claim 1 wherein said catalyst is an electroorganic synthesis catalyst.

7. The electrode of claim 1 wherein said catalyst is an electrolytic cell electrode catalyst.

8. The electrode of claim 1 wherein said film has a thickness in the range of 25 to 1000 Angstrom units.

References Cited

UNITED STATES PATENTS

| | | | |
|---|---|---|---|
| 2,915,475 | 12/1959 | Bugosh | 252—8.6 X |
| 3,040,115 | 6/1962 | Moos | 136—120 |

HOWARD S. WILLIAMS, *Primary Examiner.*

D. R. JORDAN, *Assistant Examiner.*